US008461456B2

(12) United States Patent
Bernauer

(10) Patent No.: US 8,461,456 B2
(45) Date of Patent: Jun. 11, 2013

(54) ELECTRICAL LEAD-THROUGH FOR SAFETY TANKS

(75) Inventor: Johann Bernauer, Tiefenbach (DE)

(73) Assignee: Schott AG, Mainz (DE)

( * ) Notice: Subject to any disclaimer, the term of this patent is extended or adjusted under 35 U.S.C. 154(b) by 713 days.

(21) Appl. No.: 12/584,449

(22) Filed: Sep. 4, 2009

(65) Prior Publication Data

US 2010/0065305 A1 Mar. 18, 2010

(30) Foreign Application Priority Data

Sep. 5, 2008 (DE) ......................... 10 2008 045 819

(51) Int. Cl.
*H02G 3/22* (2006.01)
*H01B 13/06* (2006.01)

(52) U.S. Cl.
USPC .................. 174/152 G; 174/50.5; 174/50.69; 174/152 GM; 361/306.1; 361/302

(58) Field of Classification Search
USPC .................. 174/152 G, 50.61, 152 GM, 50.5, 174/50.59, 50.63, 17.08, 521; 361/302, 306.1, 361/306.3, 301.3; 439/935
See application file for complete search history.

(56) References Cited

U.S. PATENT DOCUMENTS

| | | | | |
|---|---|---|---|---|
| 3,681,517 | A | 8/1972 | Meyn | |
| 4,252,394 | A * | 2/1981 | Miller | 174/152 GM |
| 4,296,275 | A * | 10/1981 | Bowsky | 174/152 GM |
| 4,461,925 | A * | 7/1984 | Bowsky et al. | 174/152 GM |
| 4,960,391 | A | 10/1990 | Beinhaur et al. | 439/559 |
| 5,017,740 | A | 5/1991 | Honkomp et al. | 174/152 |
| 5,391,061 | A * | 2/1995 | Iizuka et al. | 174/152 GM |
| 6,273,754 | B1 * | 8/2001 | Bunch et al. | 439/935 |
| 6,372,993 | B1 | 4/2002 | Eckels et al. | |
| 7,046,499 | B1 * | 5/2006 | Imani et al. | 361/302 |
| 7,442,081 | B2 * | 10/2008 | Burke et al. | 439/935 |
| 2005/0202720 | A1 | 9/2005 | Burke | |
| 2006/0155039 | A1 | 7/2006 | Alexander | |

FOREIGN PATENT DOCUMENTS

| | | |
|---|---|---|
| DE | Q 345 VIIId/21 c | 12/1955 |
| GB | 1259047 (A) | 1/1972 |
| GB | 2115238 (A) | 9/1983 |
| GB | 2192401 A | 1/1988 |
| JP | 2008053007 | 3/2008 |

OTHER PUBLICATIONS

Office Action dated Dec. 21, 2010 corresponding to German patent application No. 10 2008 045 819.8-34.
English translastion of Office Action corresponding to German patent application No. 10 2008 045 819.8-34 dated Jul. 9, 2009.
Office Action dated Jul. 9, 2009 for parallel German patent application No. 10 2008 045 819.8-34.
Notification of First Office Action dated Jan. 10, 2012 corresponding to Chinese Patent Application No. 200910170509.X.

* cited by examiner

*Primary Examiner* — Angel R Estrada
(74) *Attorney, Agent, or Firm* — Ohlandt, Greeley, Ruggiero & Perle, LLP

(57) ABSTRACT

An improved electrical lead-through, particularly for safety tanks, is provided that includes at least one electrical conductor which is guided through a rigid insulation material, wherein a silicone insulation is introduced over at least one segment of the conductor projecting on one side of the insulation material.

14 Claims, 1 Drawing Sheet

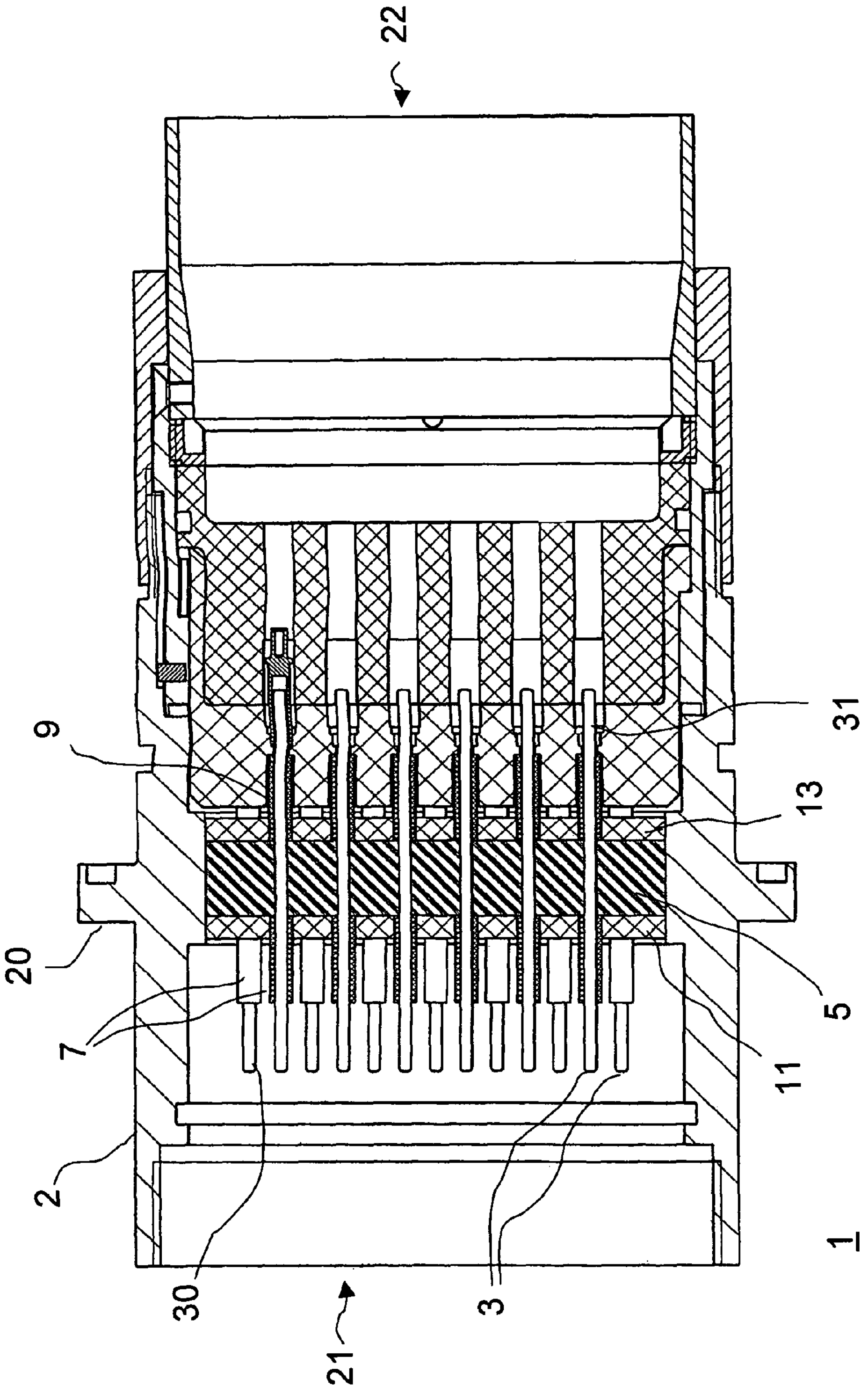
22
31
9
13
20
5
7
11
2
30
3
1
21

ELECTRICAL LEAD-THROUGH FOR SAFETY TANKS

CROSS REFERENCE TO RELATED APPLICATIONS

This application claims benefit under 35 U.S.C. §119(a) of German Patent Application No. 10 2008 045 819.8, filed Sep. 5, 2009, the entire contents of which are incorporated herein by reference.

BACKGROUND OF THE INVENTION

1. Field of the Invention

The invention generally relates to electrical lead-throughs, in particular for conducting electrical currents to and from hermetically sealed tanks. The invention especially relates to the outer side insulation of the one or more conductors of such a lead-through.

2. Description of Related Art

Electrical lead-throughs are used, among other things, as component parts or mounted parts of hermetically sealed tanks in order to conduct currents and electrical signals to and from such tanks. Vacuum tanks, in which electrical currents must be conducted into the inside of the tank, can be named as an example. Among other conditions, if high temperatures can occur on the lead-through, plastic is no longer sufficient as insulation for the conductor. Also, in the case of lead-throughs for vacuum applications, many times a very low permeability of the insulation material is required. With these prerequisites, plastic is generally unsuitable as an insulation material for the conductor. High requirements are also placed on electrical lead-throughs of safety tanks. Such tanks can be hazardous goods tanks or, in particular, tanks used in nuclear engineering, such as, e.g., reactor chambers. Here also, the lead-through should have a permeability that is as small as possible in order to prevent the penetration of hazardous materials in or out. In addition, such a lead-through also must be able to withstand high temperatures for a long time. In particular, in the case of safety tanks used in nuclear engineering, here also the long-term stability of such a lead-through is decisive for operational safety. Glass has proven particularly suitable as an insulation material for such applications. Problems may still occur, however, on the conductors themselves. For example, metal conductors are at risk of corrosion. Such a lead-through should also still function in moist environments. For example, if steam is formed inside or outside of the safety tank and moisture condenses on the conductors, the occurrence of leakage currents should be avoided.

Shrink tubings have previously been utilized for the purpose of insulating conductors of lead-throughs for safety tanks. In this case, the conductors have been tightly ensheathed in a water-tight manner by heat shrinkage. The preferred material for these tubings has previously been polyolefin. Such shrinkage tubings, however, have several disadvantages. In order to obtain sufficient flame resistance, such shrinkage tubings are in general treated with flame retardants. These flame retardants that usually contain halogens, however, are toxic and thus are not suitable for all applications. Also, shrinkage tubings are comparatively more expensive as an insulation material.

It would thus be desirable to improve electrical lead-throughs with respect to the above-named disadvantages.

BRIEF SUMMARY OF THE INVENTION

Accordingly, the invention provides an electrical lead-through, particularly for safety tanks, comprising at least one electrical conductor, which is guided through a rigid insulation material, wherein at least one segment of the conductor projecting on one side of the insulation material is ensheathed with a silicone insulation, in particular a silicone-elastomer insulation. In order to produce such an electrical lead-through, accordingly, at least one conductor is fixed in an insulation material, in such a way that the two ends of the conductor, which form the electrical terminal ends, project from the insulation material, wherein at least one segment of the conductor projecting on one side of the insulation material is ensheathed with a silicone insulation.

Silicone has the advantage of being elastic and temperature-resistant and sufficiently fire-resistant. Therefore, the use of flame retardants is no longer necessary when silicone elastomer is used as insulation for the terminal ends projecting from the insulation material of an electrical lead-through. It has been particularly found that silicone elastomer is extremely resistant to aging, which is very important, particularly when electrical lead-throughs are used for reactor safety tanks. In this case, operating safety must be assured over decades. In addition, such a lead-through should not fail even when an accident occurs. It has been shown that silicone elastomer fulfills all these requirements and also retains its elasticity, at least as long as it is necessary for the long time periods required.

In order to extend the leakage distances for leakage currents as much as possible, it is in general particularly advantageous if the silicone insulation has as large a surface as possible. For this purpose, the outer surface of the silicone insulation can run coaxially to the conductor, at least partially. In this case, a leakage current then cannot flow directly from the conductor along the surface of the insulation material to the edge of the lead-through or to another conductor, but must first flow along the conductor in the direction onto the insulation material.

It is particularly preferred if a silicone elastomer tubing is pulled over the segment of the conductor projecting on one side of the insulation material. Among other things, this offers the advantage that such an insulation can be easily changed. A particularly good sealing can then be obtained if the silicone elastomer tubing is stretched while being pulled onto the conductor. Based on its elastic properties, the tubing then solidly ensheathes the conductor and can, in fact, prevent the penetration of moisture. It has been shown to be favorable, if the silicone elastomer tubing is stretched while being pulled onto the conductor by at least 1 percent, preferably at least 2 percent, referred to the diameter of the silicone tubing in the relaxed state. Thus the tubing is found under sufficient tension in order to achieve a positioning of the conductor segment.

In addition, it is of advantage to use silicone elastomer tubings which are not too hard, in order to be able to equilibrate local inhomogeneities on the conductor surface and to obtain a frictionally engaged connection that resists slipping. Accordingly, it is proposed according to an enhancement of the invention to pull on a silicone tubing with a hardness of 40° Shore A at most, preferably 35° Shore A at most, over the conductor.

The invention is not only suitable for single lead-throughs having only one conductor; a lead-through configured according to the invention particularly advantageously can also have several conductors disposed isolated from one another in a shared insulation material. Thus, the leakage distances between the individual conductors which are can also be extended by the insulation according to the invention, so that leakage currents can also be avoided or at least greatly reduced, even in moist environments.

In addition, an enhancement of the invention is preferred, in which the outer side of the insulation material is provided with a silicone insulation, at least on the side on which the silicone insulation is introduced onto the conductor. For this purpose, a silicone elastomer compound can be applied onto the outer side of the insulation material, at least on the side on which the silicone insulation is introduced onto the conductor. The silicone insulation on the insulation material additionally prevents the formation of leakage currents that might flow either between several conductors or also from one or more conductors to a metal unit surrounding the insulation.

In order to obtain a seal also on the end of the insulation tubing pointing to the insulation material, it is additionally preferred if a silicone elastomer tubing is pulled over the segment of the conductor projecting on one side of the insulation material, and the outer side of the insulation material on the side on which the silicone elastomer tubing is pulled over the conductor is provided with a silicone insulation, in particular by coating or casting a silicone elastomer compound, which at least partially also covers the silicone tubing.

In addition, glass is particularly preferred as an insulation material for the lead-through. In this case, the at least one conductor can be fused particularly into a glass insulation, so that a hermetically sealed glass-metal transition is formed.

The invention will be explained in more detail below on the basis of an embodiment example and with reference to the appended drawing.

BRIEF DESCRIPTION OF THE SEVERAL VIEWS OF THE DRAWINGS

The single FIGURE is a cross sectional view of an exemplary embodiment of an electrical lead-through according to the present disclosure.

DETAILED DESCRIPTION OF THE INVENTION

The drawing shows an electrical lead-through according to the invention in a cross-sectional view, denoted overall by the reference number 1. Lead-through 1 comprises a hollow metal unit 2 with a basic shape that is usually rotationally symmetrical or rectangular, which serves as a housing, and a flange 20 for incorporating lead-through 1 in the wall of a tank. In particular, the electrical lead-through can be used for a nuclear safety tank, such as, e.g., a reactor chamber. Metal unit 2 comprises two openings 21, 22, by means of which terminal ends 30, 31 of a plurality of conductors 3 are accessible for cabling. Then, in the installed state, one of openings 21, 22 opens up into the safety tank, while the conductors are accessible via the other opening outside the safety tank.

Conductors 3 are guided through a solid insulation material in the form of a shared glass insulation 5, in such a way that the two terminal ends 30, 31 project out from the glass insulation. The glass insulation is also fused with the inner edge of the metal unit 2, so that a hermetic seal is produced between openings 21, 22.

In order to lengthen the leakage distances as much as possible for possible leakage currents between conductors 3 and/or the conductors and the metal unit, segments of conductors 3, which project on both sides of the glass insulation and form terminal ends 30, 31, are provided with a silicone insulation. For this purpose, silicone elastomer tubings 7, 9 in each case are pulled over the segments of conductors 3 that project out from the glass insulation 5. The outer surface of the silicone insulation thus runs coaxially to conductors 3, at least partially. The coaxially running part of the surface of the silicone insulation in this example is especially the sheath surface of silicone elastomer tubings 7, 9. Silicone elastomer tubings 7, 9 are also shorter than the projecting segments of conductors 3, or terminal ends 30, 31, so that the ends of conductor 3 remain accessible for making contacts.

In order to prevent moisture from penetrating between silicone elastomer tubings 7, 9 and the segments of conductors 3 that they surround, it is attempted to apply the silicone elastomer tubings as tightly as possible to conductors 3. This is achieved in a simple way by pulling the silicone elastomer tubings 7, 9 while stretching onto the conductors. In order to obtain sufficient tension of the silicone elastomer tubings, the silicone elastomer tubings are stretched while being pulled onto the conductor by at least 1 percent, preferably at least 2 percent, referred to the diameter of the elastomer tubings in the relaxed state. In addition, silicone elastomer tubings with a hardness of 40° Shore A at most, preferably 35° Shore A at most, are preferred in order to obtain a sufficient elasticity.

Another improvement of the insulation of conductors 3 is achieved by providing the outer sides of the insulation material, at least on the side on which silicone elastomer tubings 7, 9 are introduced on conductors 3, with a silicone insulation. In the example shown in the FIGURE, the silicone elastomer tubings are introduced on both sides. Accordingly, silicone insulation 11 or 13 is also introduced on each of the outer sides of glass insulation 5 with the projecting terminal ends 30, 31. For this purpose, a silicone elastomer compound is preferably applied onto the outer sides of the glass insulation.

In order to achieve a tight connection of silicone elastomer tubings 7, 9 at silicone insulations 11, 13 on glass insulation 5, it is particularly preferred that the outer side of the insulation material on the side on which the silicone elastomer tubing is pulled over the conductor is provided with a silicone insulation, which also at least partially covers silicone tubings 7, 9. For this purpose, the silicone elastomer compound is preferably applied after pulling on the silicone elastomer tubings 7, 9. By means of the silicone elastomer insulation additionally introduced on glass insulation 5, with tight connection to the elastomer tubings 7, 9, it is achieved that the transition between glass insulation 5 and conductors 3 is also tightly sealed, so that leakage currents cannot project from these sites, for example, in moist environments.

It is obvious to the person skilled in the art that the invention is not limited to the example of embodiment indicated above, but can be varied in many ways. Other than what is presented in the FIGURE, the invention can also be applied, for example, to a lead-through with only one conductor 3 disposed in each case in a glass insulation 5. It is also possible to dispose the silicone elastomer insulation with the tubings according to the invention only on one side of the glass insulation, if, for example, the opposite-lying side is not subjected to increased moisture or corrosive conditions. In addition, an alternative material could also be used for the glass insulation, such as, for example, ceramic insulation material or polymers, such as PEEK or epoxides either in pure form or as composites, for example.

What is claimed is:

1. An electrical lead-through, comprising:

a rigid insulation material having an outer side;

at least one electrical conductor extending through the rigid insulation material to define at least one segment projecting from the outer side;

a silicone insulation ensheathing at least one segment of the at least one electrical conductor, wherein the silicone insulation comprises a silicone elastomer tubing over the at least one segment, and wherein the silicone elastomer tubing is pulled while stretching onto the at least one conductor; and a cast or potted encapsulation of silicone elastomer on the outer side of the rigid insulation, the encapsulation at least partially covering the silicone elastomer tubing.

2. The electrical lead-through according to claim 1, wherein the silicone insulation has an outer surface that runs at least partially coaxially to the at least one electrical conductor.

3. The electrical lead-through according to claim 1, wherein the silicone elastomer tubing has a diameter that is stretched by at least 1 percent as compared to the diameter of the silicone elastomer tubing in a relaxed state.

4. The electrical lead-through according to claim 3, wherein the silicone elastomer tubing has a hardness of at most 40° Shore A.

5. The electrical lead-through according to claim 3, wherein the silicone elastomer tubing has a hardness of at most 35° Shore A.

6. The electrical lead-through according to claim 1, wherein the silicone elastomer tubing has a diameter that is stretched by at least 2 percent as compared to the diameter of the silicone elastomer tubing in a relaxed state.

7. The electrical lead-through according to claim 6, wherein the silicone elastomer tubing has a hardness of at most 40° Shore A.

8. The electrical lead-through according to claim 6, wherein the silicone elastomer tubing has a hardness of at most 35° Shore A.

9. The electrical lead-through according to claim 1, wherein the at least one conductor is fused in a glass insulation.

10. The electrical lead-through according to claim 1, further comprising a plurality of conductors isolated from one another in a shared insulation material.

11. A method for producing an electrical lead-through, comprising:

fixing at least one conductor in an insulation material in such a way that ends of the at least one conductor project from opposite sides of the insulation material;

ensheathing at least one at least one segment of the conductor projecting from an outer side of the insulation material with a silicone elastomer insulation, wherein the ensheathing step comprises stretching the silicone elastomer insulation over the at least one segment of the conductor, and wherein the silicone elastomer insulation comprises silicone elastomer tubing and the stretching step further comprises pulling the silicone elastomer tubing while stretching onto the conductor; and coating a silicone elastomer compound onto the outer side of the insulation material, wherein the coating the silicone elastomer compound step further comprises coating, at least partially, the silicone elastomer tubing with the silicone elastomer compound after pulling on the silicone elastomer tubing.

12. The method according to claim 11, wherein the stretching step comprises stretching a diameter of the silicone elastomer tubing by at least 1 percent as compared to the diameter of the silicone elastomer tubing in a relaxed state.

13. An electrical lead-through, comprising:

a rigid insulation material having an outer side;

at least one electrical conductor extending through the rigid insulation material to define at least one segment projecting from the outer side;

a silicone elastomer tubing ensheathing at least one segment of the at least one electrical conductor, the silicone elastomer tubing having a diameter that is stretched by at least 1 percent with respect to the diameter of the silicone tubing in a relaxed state; and a cast or potted encapsulation of silicone elastomer on the outer side of the rigid insulation and at least partially covering the silicone elastomer tubing, the encapsulation being applied after the silicone elastomer tubing is stretched on the at least one segment.

14. The electrical lead-through according to claim 13, wherein the diameter is stretched by at least 2 percent.

* * * * *